United States Patent
Wu et al.

(10) Patent No.: US 8,830,171 B2
(45) Date of Patent: Sep. 9, 2014

(54) APPARATUS FOR NON-CONTACT 3D HAND GESTURE RECOGNITION WITH CODE-BASED LIGHT SENSING

(75) Inventors: Kao Pin Wu, New Taipei (TW); Cheng Ta Chuang, New Taipei (TW)

(73) Assignee: Eminent Electronic Technology Corporation, Taipei (TW)

( * ) Notice: Subject to any disclaimer, the term of this patent is extended or adjusted under 35 U.S.C. 154(b) by 231 days.

(21) Appl. No.: 13/477,196

(22) Filed: May 22, 2012

(65) Prior Publication Data
US 2013/0314317 A1    Nov. 28, 2013

(51) Int. Cl.
G09G 5/08    (2006.01)
(52) U.S. Cl.
USPC .......................................... 345/158; 345/173
(58) Field of Classification Search
USPC .................................................. 345/156–179
See application file for complete search history.

(56) References Cited

U.S. PATENT DOCUMENTS

| | | | | |
|---|---|---|---|---|
| 2008/0128178 A1* | 6/2008 | Jia | ............................... | 178/18.01 |
| 2009/0265627 A1 | 10/2009 | Kim et al. | | |
| 2010/0050134 A1 | 2/2010 | Clarkson | | |
| 2010/0111358 A1 | 5/2010 | Chai et al. | | |
| 2010/0150399 A1* | 6/2010 | Svajda et al. | ................. | 382/103 |
| 2010/0234044 A1* | 9/2010 | Lohbihler | .................. | 455/456.1 |
| 2011/0181509 A1* | 7/2011 | Rautiainen et al. | ........... | 345/158 |
| 2011/0310005 A1* | 12/2011 | Chen et al. | ..................... | 345/156 |
| 2013/0050425 A1* | 2/2013 | Im et al. | .......................... | 348/46 |
| 2013/0120238 A1* | 5/2013 | Spaulding et al. | ............ | 345/156 |

FOREIGN PATENT DOCUMENTS

| | | |
|---|---|---|
| JP | 61290581 | 12/1986 |
| JP | 283748 | 3/1990 |
| TW | 200617355 | 6/2006 |
| TW | 201033518 | 9/2010 |
| TW | 201120418 | 6/2011 |

OTHER PUBLICATIONS

Hand Gesture Recognition for Human-Machine Interaction, Elena Sánchez-Nielsen, Luis Antón-Canalís, Mario Hernández-Tejera, Journal of WSCG, vol. 12, No. 1-3, ISSN 1213-6972 WSCG'2004, Feb. 2-6, 2003, Plzen, Czech Republic. Copyright Union Agency—Science Press.

\* cited by examiner

*Primary Examiner* — Premal Patel
(74) *Attorney, Agent, or Firm* — Winston Hsu; Scott Margo

(57) ABSTRACT

An apparatus for non-contact 3D hand gesture recognition with code-based light sensing is provided, including a plurality of light emitters, at least a light sensor, and a controller, wherein the controller is connected to and controls the plurality of light emitters to emit lights containing a respective identification code. The emitted lights can be reflected by an object, for example, a hand in our application. The at least a light sensor can identify the original light emitter of each respective reflected light through the identification code as well as computing the power level of each respective reflected light to determine the distance or location of the object. The hand gesture recognition can be deduced based on the power levels of respective reflected lights over a time period.

8 Claims, 11 Drawing Sheets

US 8,830,171 B2

APPARATUS FOR NON-CONTACT 3D HAND GESTURE RECOGNITION WITH CODE-BASED LIGHT SENSING

FIELD OF THE INVENTION

The present invention generally relates to an apparatus for 3D hand gesture recognition, and more specifically to an apparatus for non-contact 3D hand gesture recognition with code-based light sensing.

BACKGROUND OF THE INVENTION

Hand gesture recognition is an emerging field catching much attention recently due to the popularity of interactive computer games as well as mobile devices. Conventional hand gesture recognition is often vision-based and relies on a matching process where the captured hand movement is compared with the recognizable hand postures stored in the system's visual memory. For example, Sanches-Nielsen et al. published an article titled Hand Gesture Recognition for Human-Machine Interaction in Journal of WSCG, Vol. 12, No. 1-3, ISSN 1213-6972 disclosing a process of the recognition framework including initialization, acquisition, segmentation, pattern recognition and executing action. The acquisition of the hand gesture is through the webcam capturing frames of images. Similarly, U.S. Patent Application Publication No. 2010/0050134 disclosed enhanced detection of circular engagement gesture by using a camera to capture a user's image and comparing motion history data. U.S. Patent Application Publication No. 2010/0111358 disclosed a method, apparatus and computer program product for providing adaptive gesture analysis, wherein a 3D camera is used to capture the intensity and depth of the image for subsequent gesture analysis. Another technique to detect hand gesture for mobile device is through the use of an inertia sensor, as disclosed in U.S. Patent Application Publication No 2009/0265627, to control the user interface of a mobile device. The inertia sensor can detect the user's hand gestures by detecting the movement of the mobile device.

Even as the optical technology has developed rapidly in recent years, the technology is mostly often applied to applications, such as, communication systems, pointing devices or motion detection in surveillance systems. In addition, a conventional optical-based motion detection system may employ a plurality of optical-based light sensors in a surveillance system for a wide coverage and yet save the bandwidth to detect moving objects. In the above case, the time division multiple access (TDMA) method is often employed to allow a plurality of emitters to access a shared channel through time division.

Alternatively, code division multiple access (CDMA), a widely used channel access technology for radio communications, also allows several transmitters to send information simultaneously over a single communication channel; hence, a plurality of users can share a band of frequencies. CMDA employs spread-spectrum technology and a special coding scheme where each emitter is assigned a code to allow multiple users to be multiplexed over the same channel. In other words, as opposed to TDMA that uses time division to share a channel among a plurality of emitters, CDMA assigns a different code for each emitter to allow sharing of a channel and improve channel efficiency. In asynchronous CDMA system, unique pseudo random or pseudo noise sequences are used. A pseudo noise code is a binary sequence that appears random but can be reproduced in a deterministic manner by intended receivers of the corresponding transmission. The pseudo noise codes are used to encode and decode a user's signal in asynchronous CDMA. As asynchronous CDMA shows efficient utilization of fixed frequency spectrum and allows flexible allocation of resources compared to other techniques, asynchronous CDMA is employed in various applications.

The aforementioned pseudo noise sequences are statistically unrelated and the sum of a large number of pseudo noise sequences results in a multiple access interface (MAI) that can be approximated by a Gaussian noise process. Gold codes are a good example of pseudo noise sequences for this purpose, as there is low correlation between the codes. Gold codes, named after Robert Gold, have a bounded small cross-correlation within a set, which is useful when multiple devices are broadcasting in the same range. For example, a set of Gold codes consists of $2^n-1$ sequences, with each one having a period of $2^n-1$. Within a set of Gold codes, about half of the codes are balanced, that is, the number of ones and zeros differs only by one. However, other coding schemes that possess similar characteristics can also be utilized to achieve the same object.

SUMMARY OF THE INVENTION

The primary object of the present invention is to provide an apparatus for non-contact 3D hand gesture recognition, able to recognize hand gesture as to provide input for controlling an interactive system.

Another object of the present invention is to provide an apparatus for non-contact 3D hand gesture recognition, simple in structure and flexible in application coverage.

Yet another object of the present invention is to provide an apparatus for non-contact 3D hand gesture recognition, immune to ambient noise signal interference and applicable in an environment with multiple deployments.

To achieve the above objects, the present invention provides an apparatus for non-contact 3D hand gesture recognition with code-based light sensing, including a plurality of light emitters, at least a light sensor, and a controller, wherein the controller is connected to and controls the plurality of light emitters to emit lights containing a respective identification code. The emitted lights can be reflected by an object, for example, a hand in our application. The at least a light sensor can identify the original light emitter of each respective reflected light through the identification code as well as computing the power level of each respective reflected light to determine the distance or location of the object. The hand gesture recognition can be deduced based on the power levels of respective reflected lights.

It is worth noting that the code used in the present invention is not restricted to any specific coding scheme. The embodiments disclosed in the present invention show an exemplar using Gold Code of asynchronous CDMA, and another exemplar using a different coding scheme to further shorten the number of bits required.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
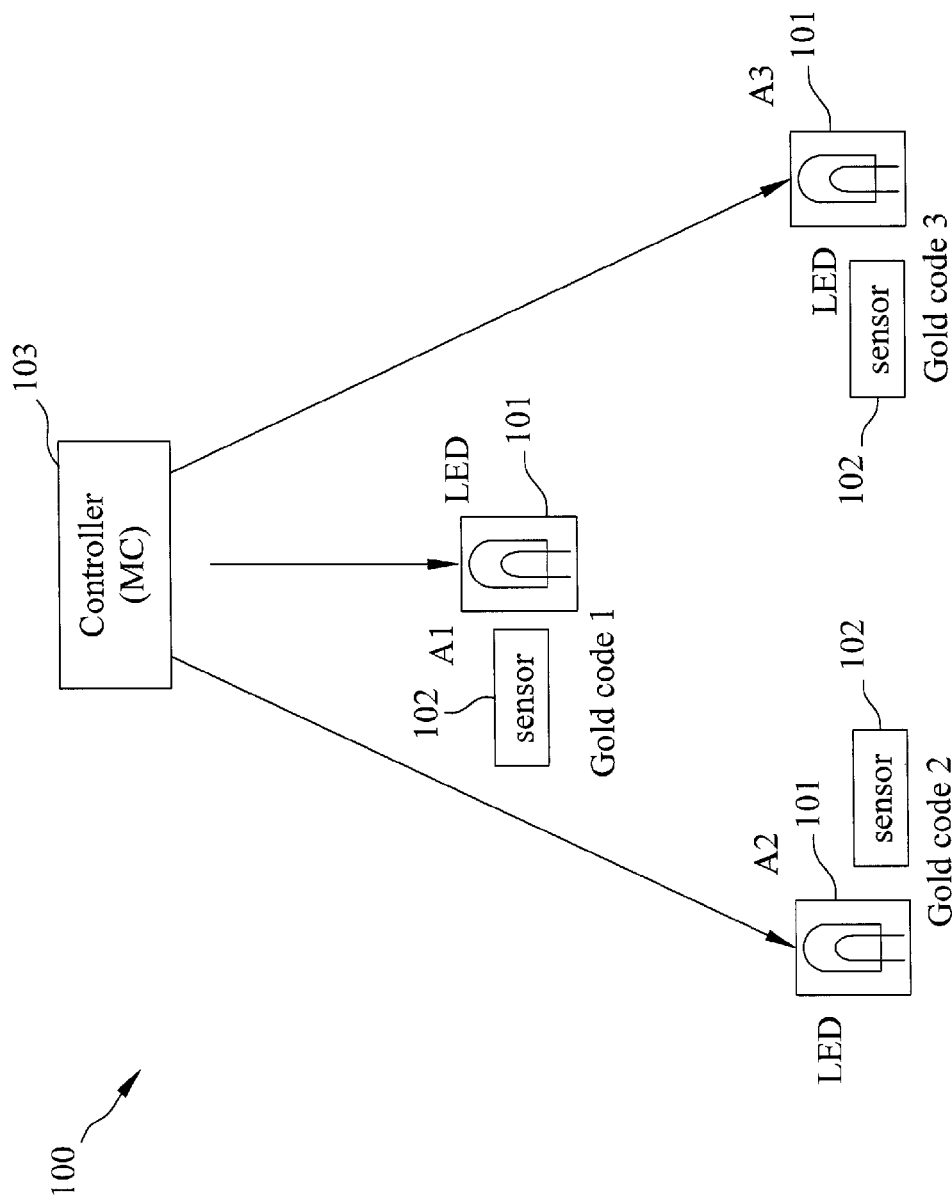
FIG. 1 shows a schematic view of a first embodiment of the present invention.

FIG. 1 shows a schematic view of a first embodiment of the present invention with a single light sensor. As shown in FIG. 1, an apparatus 100 of the present invention for non-contact 3D hand gesture recognition with code-based light sensing includes a plurality of light emitters 101, a plurality of light sensors 102 and a controller 103. The numbers and the placement distribution of light emitters 101 and light sensors 102 are not restricted to any specific amount or pattern. For preferred result, the number of light emitters should be at least 3, and all the light emitters as well as light sensors are preferably not arranged in a collinear manner. However, the above conditions are not restrictive or mandatory to achieve 3D hand gesture recognition, and are only for illustrative purpose for preferable outcomes.

As shown in FIG. 1, this embodiment includes three light emitters 101 and three light sensors 102. Each light sensor is placed close to a light emitter, and each such arrangement is referred to as A1, A2, A3 respectively. Controller 103 are connected to each of light emitters 101 and controls the timing, duration and the power level of the light emitted by three light emitters 101. The light emitters can either emit light simultaneously or take turns to emit the light. Light emitters 101 can be, for example, light-emitting diode (LED), and preferably infra-red LED (IRLED). It is worth noting that the light emitted by each of three light emitters 101 has a unique identification code. Light sensors 102 are for receiving light emitted from said plurality of light emitters and reflected by an object (not shown), identifying said unique identification code in each said reflected light and computing a power level of each said received reflected light to determine a position and distance of said object. In the above embodiment, the identification code is Gold Code commonly used in asynchronous CDMA, labeled as Gold Code 1, Gold Code 2 and Gold Code 3, respectively. As aforementioned, Gold Codes have the property that two different codes in the set have a very low correlation value while the same code has a high correlation value. Hence, when the emitted light is reflected by the object, for example, a hand, the Gold Code contained in the reflected light can be used to identify the source of the light emitter through a correlation computation. However, the use of Gold Code in the present exemplary embodiment is only for illustrative instead of restrictive. Other coding schemes possessing similar characteristics can also be utilized to achieve the same object.

Figure 2:
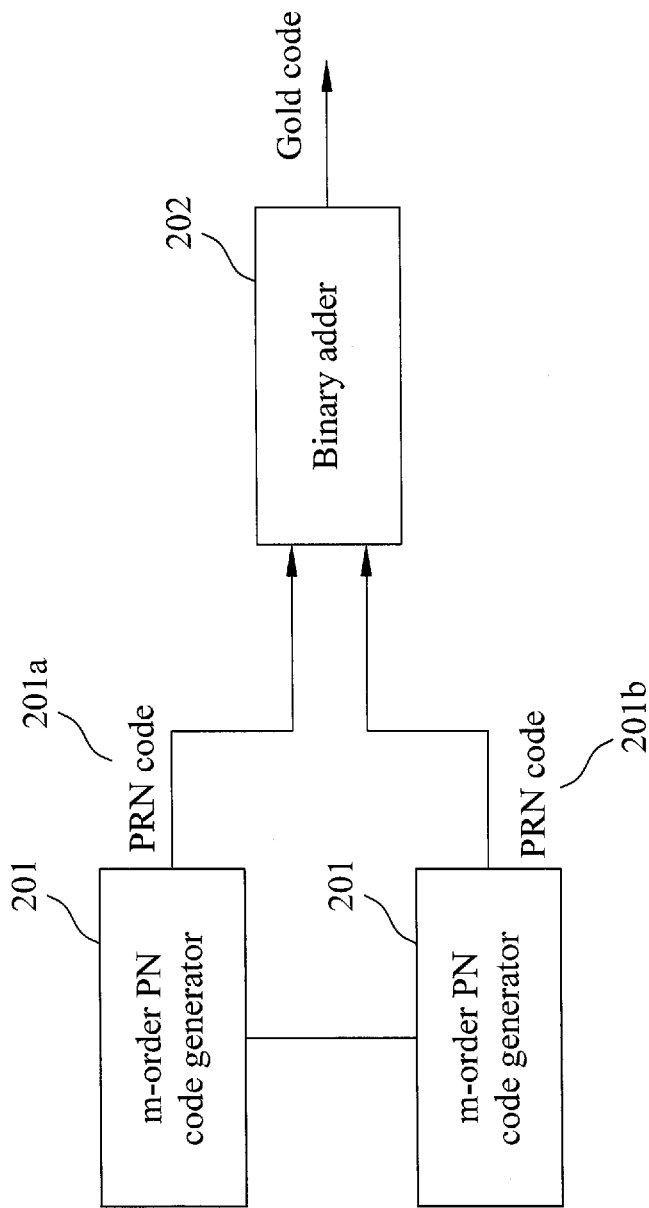
FIG. 2 shows a schematic view of a Gold Code generator of the present invention.

FIG. 2 shows a schematic view of a Gold Code generator according to the present invention. As shown in FIG. 2, each of two m-order pseudo noise (PN) code generators 201 generates a pseudo random noise (PRN) code 201a, 201b respectively. A binary adder 202 is used to add PRN code 201a and PRN code 201b, and the result is a Gold Code sequence. For example, in the present invention, a Gold Code can be designed as a digital sequence having a fixed number of ones in the sequence.

Figure 3:
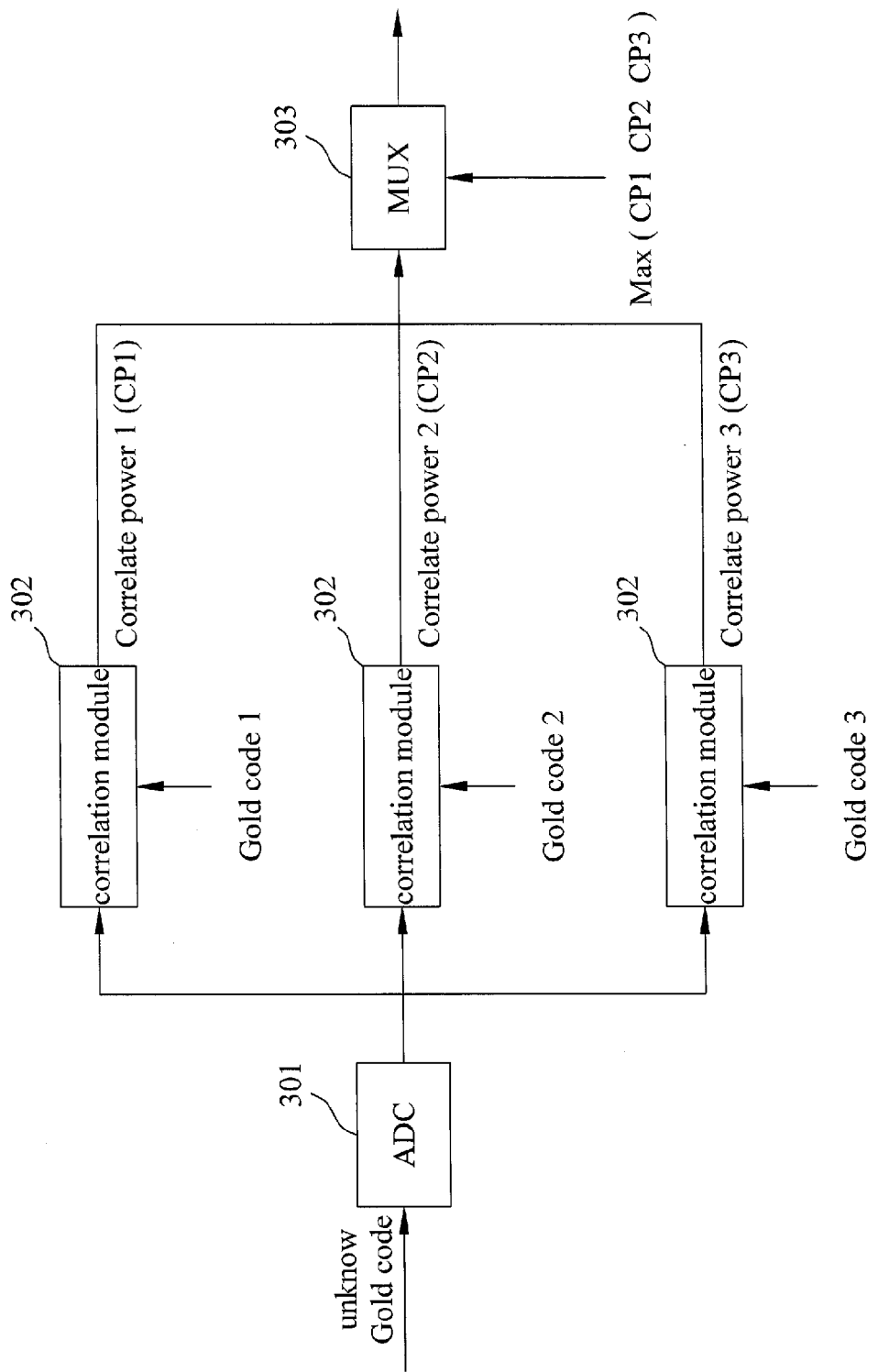
FIG. 3 shows a schematic view of an embodiment of a light sensor computing the Gold Code to identify the emitter according to the present invention.

FIG. 3 shows a schematic view of an embodiment of a light sensor computing the Gold Code to identify the emitter according to the present invention. As shown in FIG. 3, when a light sensor extracts an unknown Gold Code in the reflected light, the unknown Gold code is converted by an ADC 301 into digital sequence, and fed into a plurality of correlation modules 302. A correlation module 302 must be included for each Gold Code sequence, used in the apparatus of the present invention, for example, Gold Code 1, Gold Code 2 and Gold Code 3 in this embodiment. Each correlation module 302 compares the received digital sequence from ADC 301 with the associated Gold Code to generate a correlated power level. Because of the correlation characteristics of Gold Codes, the highest correlation power level would be the correlation module with the same Gold Code as the digital sequence. A multiplexer (MUX) 303 is used to select the maximum among the correlation power levels to accomplish the identification of the corresponding Gold Code.

Figure 4:
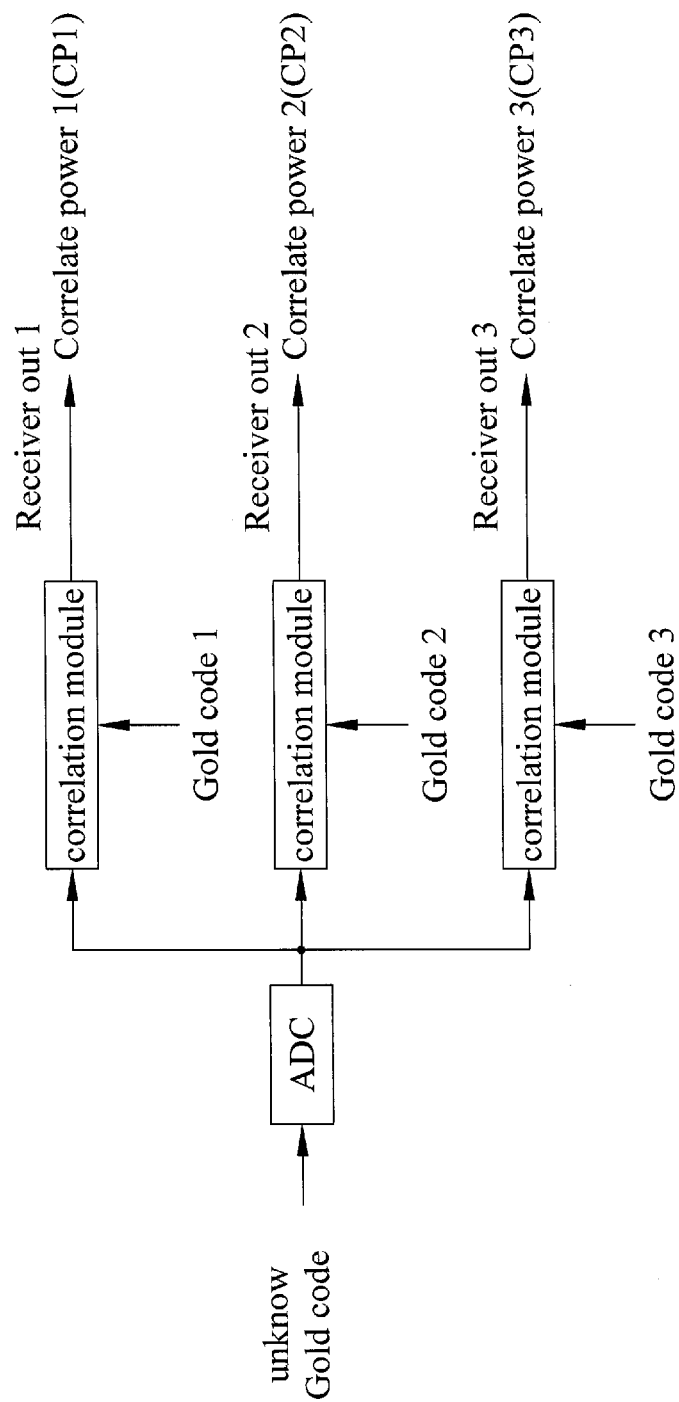
FIG. 4 shows a schematic view of another embodiment of a light sensor computing the Gold Code to identify the emitter according to the present invention.

FIG. 4 shows a schematic view of a second embodiment of a light sensor computing the Gold Code to identify the emitter according to the present invention. The embodiment in FIG. 4 is similar to the embodiment in FIG. 3, except that the embodiment in FIG. 4 does not include a multiplexor (MUX) 303 to select the maximum among the correlation power levels computed by a plurality of correlation modules 302. In this manner, all the correlation power levels can be outputted for the next stage computation (not shown in FIG. 4).

Figure 5:
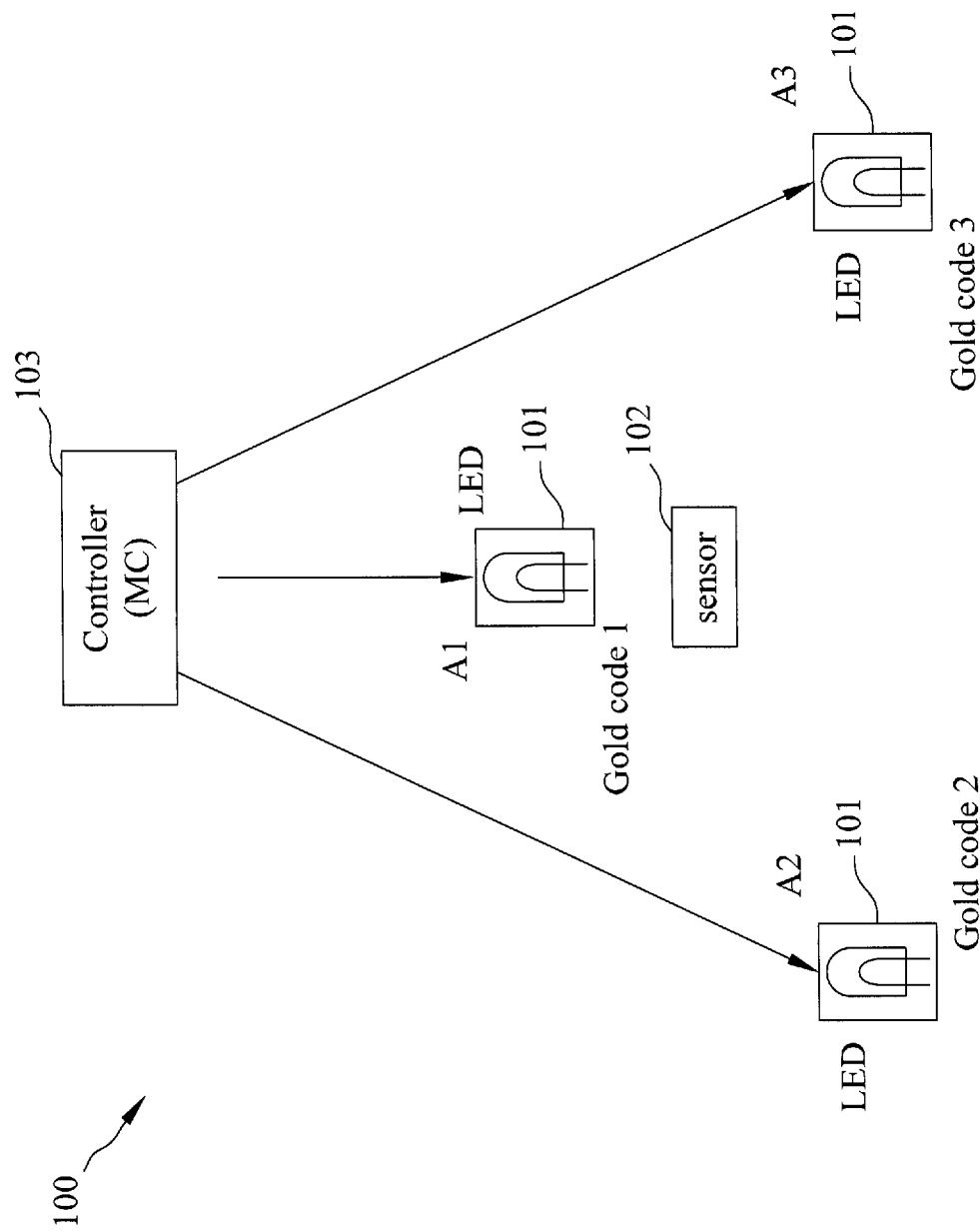
FIG. 5 shows a schematic view of a second embodiment of the present invention having a single light sensor.

FIG. 5 shows a schematic view of a second embodiment of the present invention having three light sensors. As shown in FIG. 5, this embodiment includes three light emitters A1, A2, A3, and a single light sensor 102, with light sensor 102 placed close to a location where light sensor 102 can receive each light reflected from the object and performs the correlation.

Comparing the embodiment in FIG. 1 and the embodiment in FIG. 5, it is worth noting that the inclusion of multiple light sensors in the embodiment of FIG. 1 can improve recognition sensitivity and accuracy to cover a larger sensing area as well as providing additional redundancy for fault tolerance, while the embodiment of using a single light sensor in FIG. 5 can save the cost. On the other hand, the embodiment in FIG. 1 allows each light sensor to include only one correlation module to compare the received digital sequence with one associated Gold Code. If the correlation between the received digital sequence and the associated Gold Code is high, the output of the light sensor would be high, while the outputs from the remaining light sensors would be very low. In this case, the cost of manufacturing a light sensor can be further reduced.

It is also worth noting that both embodiments of light sensors computing correlation power levels to identify the emitter in FIG. 3 and FIG. 4 are applicable to both exemplars in FIG. 1 and FIG. 5. Furthermore, these and the above-mentioned allowing only one correlation module in the light sensor clearly show that a deployment of the present invention can be actualized in various combinations to achieve the same purpose, which further provides flexibility to actual applications.

Figure 6:
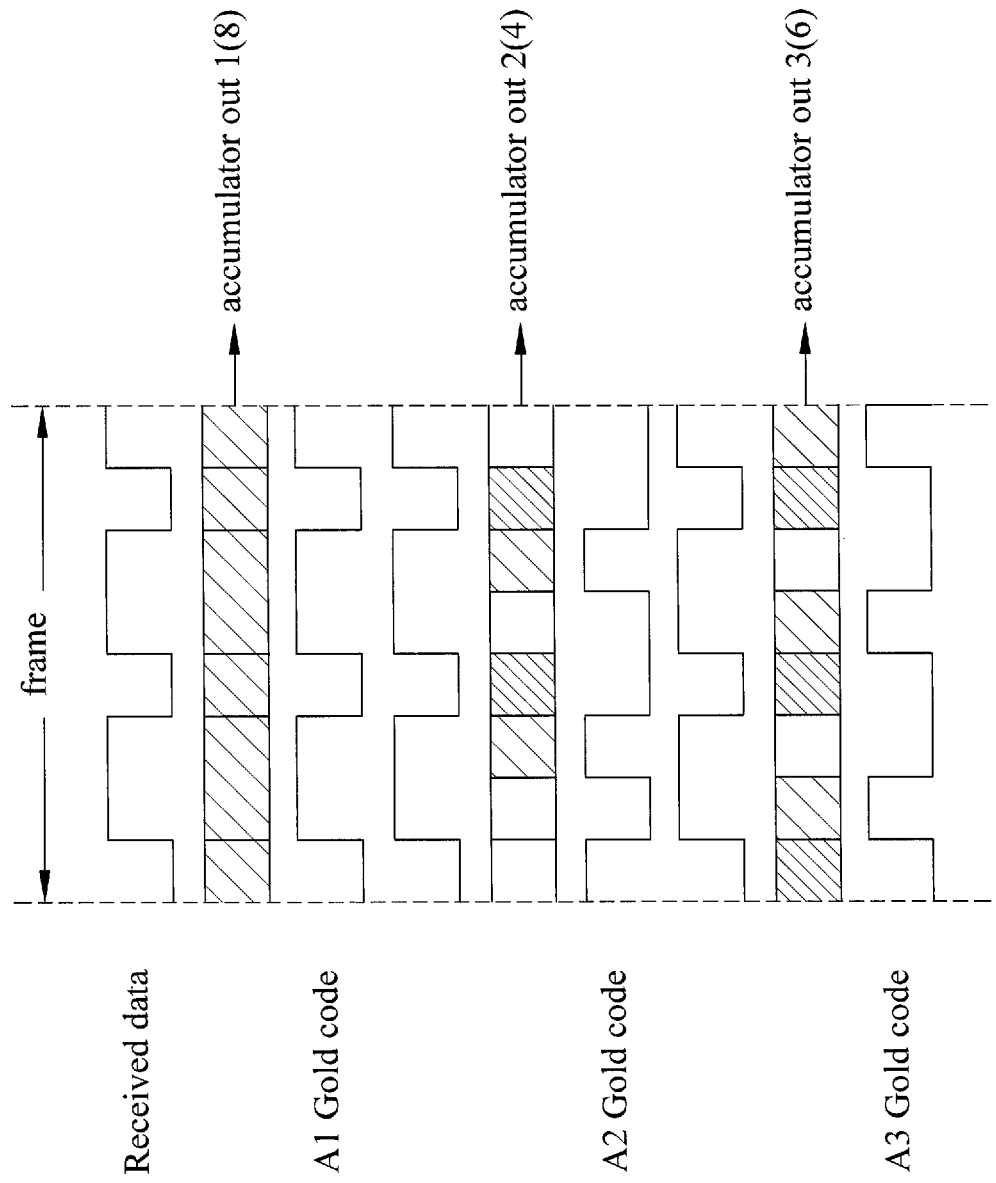
FIG. 6 shows a schematic view of the waveform representation of the correlation power levels generated in FIGS. 3 and 4.
Figure 7A:
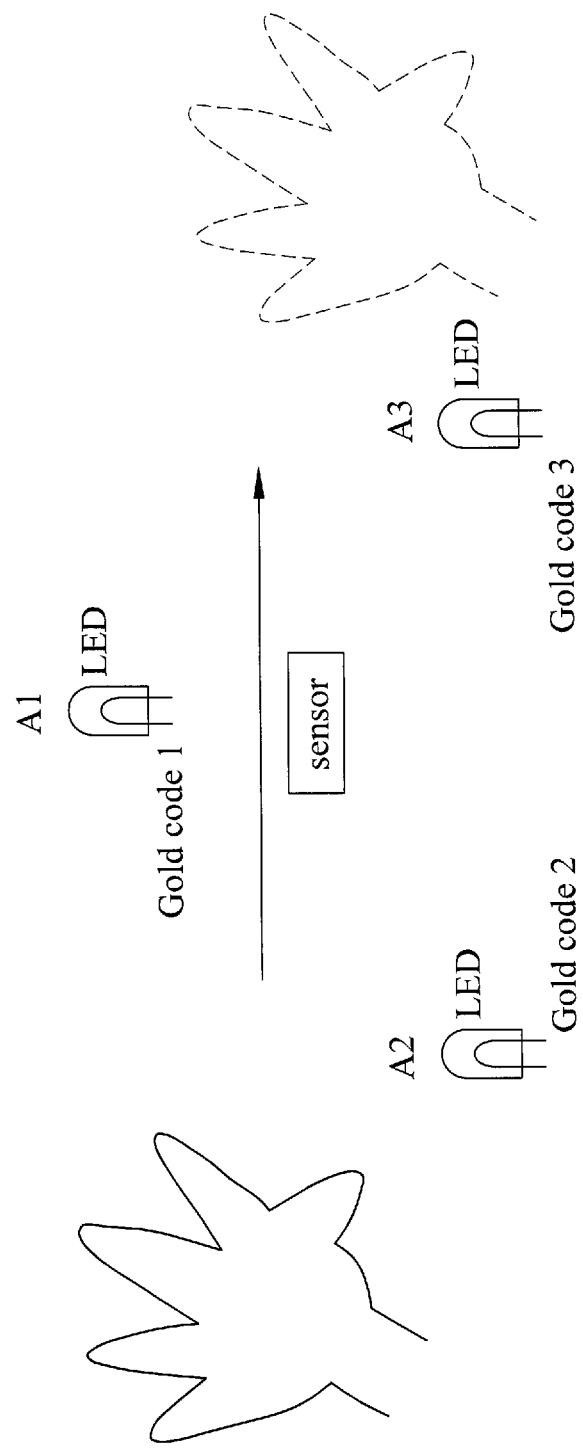
FIG. 7A shows a schematic view of a hand moving from left to right through the embodiment of FIG. 5 of the present invention.
Figure 7B:
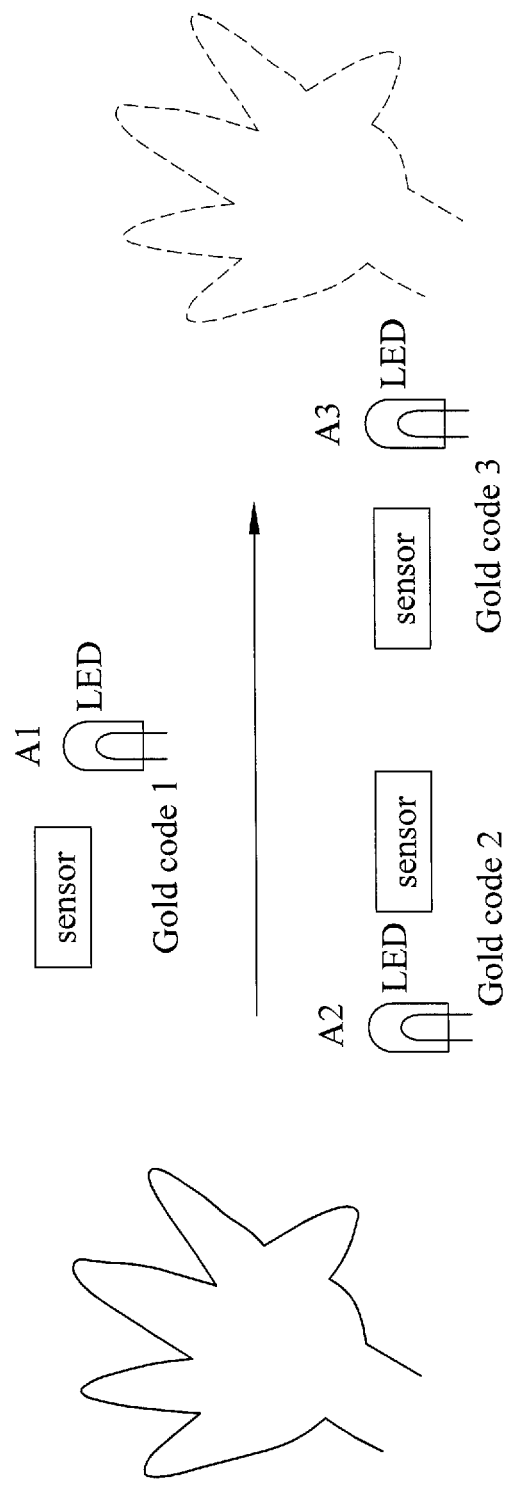
FIG. 7B shows a schematic view of a hand moving from left to right through the embodiment of FIG. 1 of the present invention.
Figure 8A:
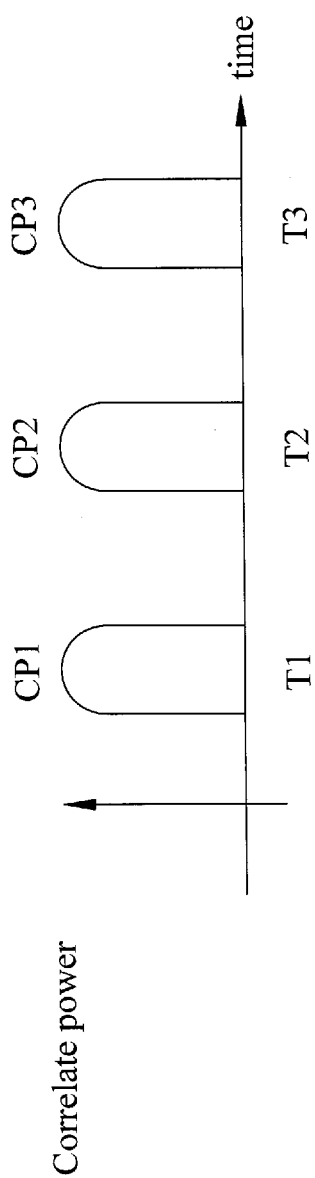
FIG. 8A shows a schematic view of correlation power level of sensed signals corresponding to FIG. 7A.
Figure 8B:
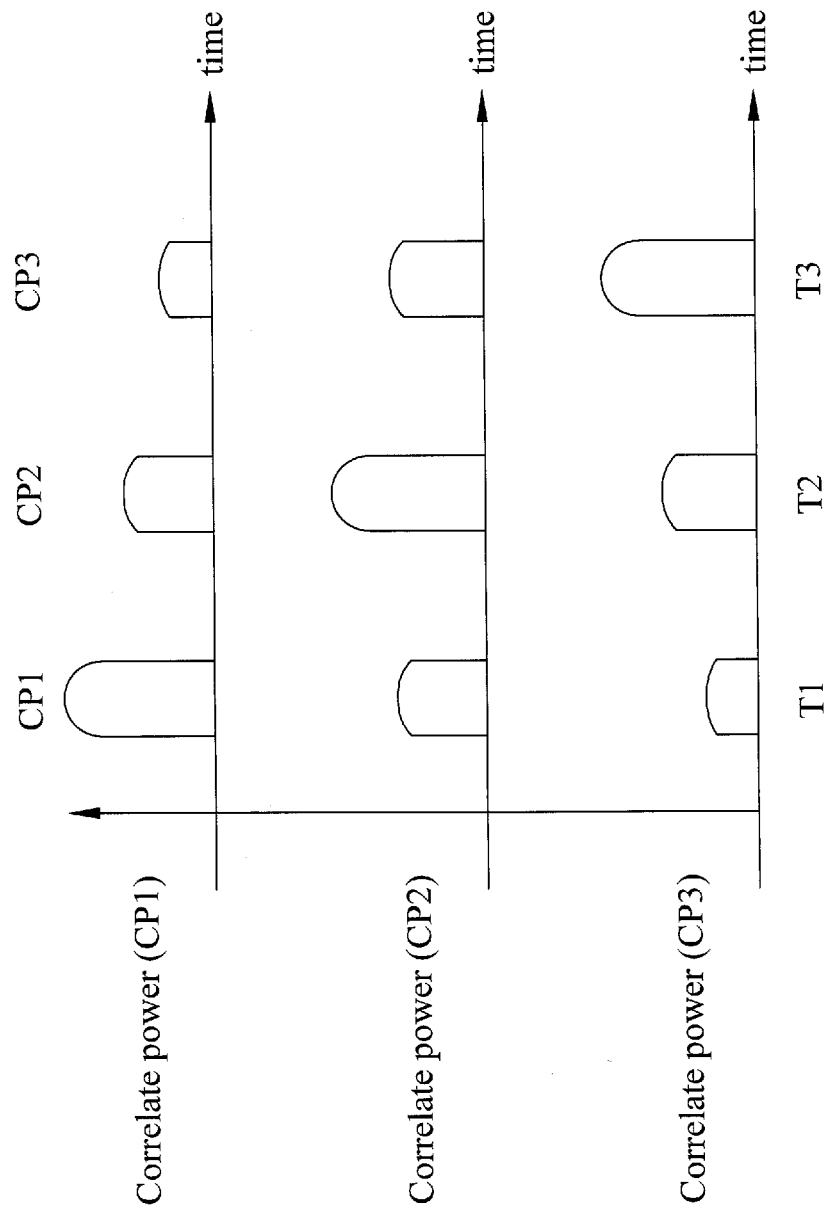
FIG. 8B shows a schematic view of correlation power level of sensed signals corresponding to FIG. 7B.

FIG. 6 shows a schematic view of the waveform representation of the correlation power levels generated in FIG. 3 and FIG. 4. As shown in FIG. 6, the correlation computation is performed on the received data from light emitters A1, A2 and A3 respectively and the respective Gold Codes of A1, A2, A3. The area with slanted lines in FIG. 6 shows an accumulator item that shows a high correlation in the received data and the Gold Code. In the exemplar, the received code is 01101101. After the correlation computation, the accumulated correlation outputs from A1 (code: 01101101), A2 (code: 10100100), and A3 (code: 01001001) are 8, 4 and 6 respectively. As seen in FIG. 6, received data from A1 has the highest accumulator output among the three correlation modules; therefore, the received data is from light emitter A1. It is worth noting that once the light emitting source of the reflected light is identified and the corresponding power level is obtained, the position and distance of the object can be then deduced. When a plurality of position and distance information over a time period is obtained, the hand gesture can further be determined FIGS. 7A-7B show schematic views of an actual application of the present invention and related detected signals, and FIGS. 8A-8B show schematic views of sensed signals in FIGS. 7A-7B respectively. As shown in FIG. 7A, a hand moves from left to right through the embodiment of FIG. 5 of the present invention, wherein three light emitters A1, A2, A3 and a light sensor are included. FIG. 7B shows a schematic view of a hand moving from left to right through the embodiment of FIG. 1 of the present invention, wherein three light emitters A1, A2, A3 and three light sensors are included. FIG. 8A shows a schematic view of sensed signals corresponding to scenario in FIG. 7A As shown in FIG. 8A, reflected light emitted by light emitter A2 is first sensed because the hand first moves close to A2, followed by sensed signals from A1 and A3 respectively. Similarly, FIG. 8B shows a schematic view of sensed signals corresponding to scenario in FIG. 7B. As shown in FIG. 8B, the correlation power levels computed by each light sensor are all outputted.

Figure 9:
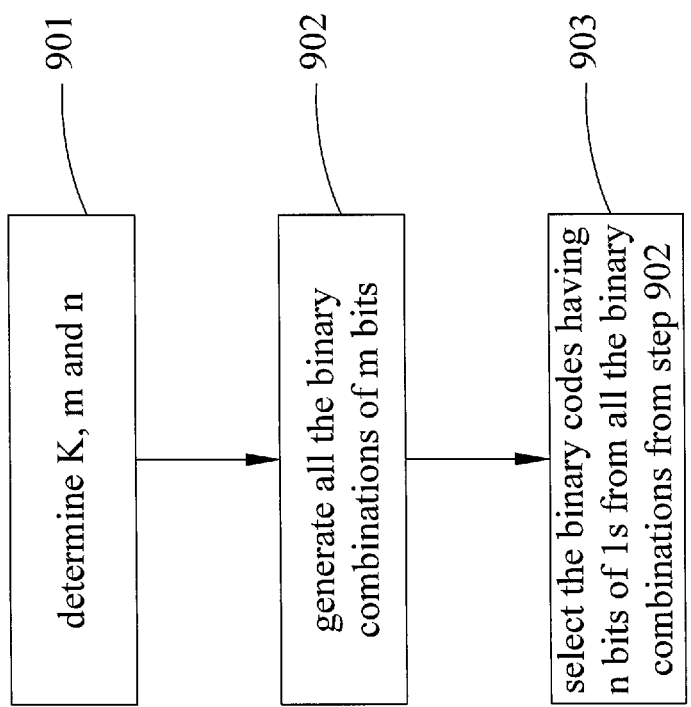
FIG. 9 shows a flowchart of an alternative embodiment to generate code for the present invention.

As aforementioned, the code used in the present invention is not limited to Gold Code of asynchronous CDMA. Alternative coding schemes can also be used to embody the code of the present invention. For example, assume that m is the number of bits of each code, n is the number of bits with the value 1, and K is the number of codes used in a 1-of-n code. A 1-of-n code is defined as each n-bit code having one bit of 1. Then, the equation $$k = C_n^m = \frac{m!}{(m-n)!m!}$$

can be used to determine the number of bits required for the alternative coding scheme. In other words, m bits will be sufficient to provide the same number of codes available as K bits used in 1-of-n coding scheme, where K>m>n. The higher K is, the difference between K and m will be. Hence, more bits are saved. FIG. 9 shows a flowchart of the above coding scheme to generate the code according to the present invention. As shown in FIG. 9 step 901 is to determine K, m and n.

Step 902 is to generate all the binary combinations of m bits. Step 903 is to select the binary codes having n bits of 1s from all the binary combinations from step 902 to obtain the required codes. The selected codes will be of m-bit length with n bits of 1s.

For example, for m=4, n=2, and K=6, the whole possible binary combinations will include 0000, 0001, 0010, 0011, 0100, 0101, 0110, 0111, 1000, 1001, 1010, 1011, 1100, 1101, 1110, and 1111. Among the above 16 combinations, only the combinations of 0011, 0101, 0110, 1001, 1010, and 1100 have two bits of 1s, i.e., n=2. Therefore, the codes 0011, 0101, 0110, 1001, 1010, and 1100 are selected as the codes to assign to each emitter of the present invention. In comparison, the 1-of-n codes will be 000001, 000010, 000100, 001000, 010000, and 100000.

Similarly, for m=5, n=3, and K=10, the whole possible binary combinations will include 00000, 00001, 00010, 00011, 00100, 00101, 00110, 00111, 01000, 01001, 01010, 01011, 01100, 01101, 01110, 01111, 10000, 10001, 10010, 10011, 10100, 10101, 10110, 10111, 11000, 11001, 11010, 11011, 11100, 11101, 11110, and 11111. Among the above 32 combinations, only the combinations of 00111, 01011, 01101, 01110, 10011, 10101, 10110,11001, 11010, and 11100 have three bits of 1s, i.e., n=3. Therefore, the codes 00111, 01011, 01101, 01110, 10011, 10101, 10110, 11001, 11010, and 11100 are selected as the codes to assign to each emitter of the present invention. In comparison, the 1-of-n codes will be 0000000001, 0000000010, 0000000100, 0000001000, 0000010000, 0000100000, 0001000000, 0010000000, 0010000000, 0100000000, and 1000000000. As seen from the two examples, the higher the K is in 1-of-n coding scheme, the difference between K and m will be, and hence, more bits are saved.

Furthermore, an apparatus for non-contact 3D hand gesture recognition with code-based light sensing of the present invention can be used to provide input to control an interactive system, for example, an interactive TV, games or mobile device. It is also worth noting that the placement distribution and the number of parts in realizing the present invention can be adjusted for various applications. In addition, the Gold Code sequences and alternative coding schemes employed in the present invention allows a plurality of the present invention to be deployed in close proximity, for example, two systems deployed side-by-side without interfering each other when different codes based on Gold Code or alternative coding schemes are used.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A non-contact 3D hand gesture recognition apparatus, comprising:
    a plurality of light emitters, each able to emit a light comprising a unique identification code, said plurality of light emitters able to emit light simultaneously or taking turns to emit light;
    a controller, connected to said plurality of light emitters for controlling timing, duration and power level of light emitted by said plurality of light emitters; and
    at least a light sensor, for receiving light emitted from said plurality of light emitters and reflected by an object, performing a correlation computation on said identification code to identify said unique identification code in each said reflected light and computing a power level of each said received reflected light to determine a position and distance of said object;

wherein said light sensor comprises;

an analog-to-digital converter (ADC), for converting received reflected light into a digital sequence and extracting said unique identification code from said digital sequence; and at least a correlation module, each said correlation module receiving said unique identification code in said digital sequence and computing correlation with a unique identification code of a said light emitter to determine a power level.

2. The non-contact 3D hand gesture recognition apparatus as claimed in claim 1, wherein said object is a hand, and said light sensor further deduces hand gesture based on a plurality of position and distance of said hand over a period of time duration.

3. The non-contact 3D hand gesture recognition apparatus as claimed in claim 2, wherein said hand gesture recognition is used as input to control interactive systems.

4. The non-contact 3D hand gesture recognition apparatus as claimed in claim 1, wherein said plurality of light emitters is light-emitting diodes (LED).

5. The non-contact 3D hand gesture recognition apparatus as claimed in claim 4, wherein said plurality of light emitters is infra-red light-emitting diodes (IRLED).

6. The non-contact 3D hand gesture recognition apparatus as claimed in claim 1, wherein said unique identification code is Gold Code used in asynchronous CDMA.

7. The non-contact 3D hand gesture recognition apparatus as claimed in claim 1, wherein said light sensor further comprises:

a multiplexer, for connecting to said at least a correlation module to select a maximum among said power levels outputted by said correlation module, and determining said unique identification code of said correlation module having highest power level as original light emitter emitting said received reflected light.

8. The non-contact 3D hand gesture recognition apparatus as claimed in claim 1, wherein said unique identification code is generated by the steps of:

determining K, m and n, K being a number of a 1-of-n code, m being a number of bits required for coding and n being a number of bits having value 1;

generating all binary combinations of m bits; and selecting binary codes having n bits of 1s from said all binary combinations to obtain said unique identification codes;

wherein value of n being close of half of value of m.

* * * * *